United States Patent [19]

Terasaka et al.

[11] Patent Number: 4,906,539

[45] Date of Patent: Mar. 6, 1990

[54] SINTERED TYPE NEGATIVE CADMIUM ELECTRODE FOR AN ALKALINE STORAGE CELL AND METHOD OF MANUFACTURING THE SAME

[75] Inventors: Masayuki Terasaka; Tukasa Itou; Takahisa Awajitani; Kazuhiro Matsui, all of Sumoto, Japan

[73] Assignee: Sanyo Electric Co., Ltd., Moriguchi, Japan

[21] Appl. No.: 216,487

[22] Filed: Jul. 8, 1988

[30] Foreign Application Priority Data

Jul. 8, 1987 [JP] Japan .................................. 62-170534
Nov. 20, 1987 [JP] Japan .................................. 62-294333

[51] Int. Cl.$^4$ .............................................. H01M 4/36
[52] U.S. Cl. ..................................... 429/217; 429/222; 427/58; 427/415; 252/182.1
[58] Field of Search .................... 429/222, 217, 215; 427/415, 58; 29/623.5; 252/182.1

[56] References Cited

U.S. PATENT DOCUMENTS

| | | | |
|---|---|---|---|
| 2,448,052 | 8/1948 | Roberts | 429/222 X |
| 3,918,989 | 11/1975 | Gillman et al. | 429/215 X |
| 4,118,551 | 10/1978 | Chireau et al. | 429/217 X |
| 4,328,297 | 5/1982 | Bilhorn | 429/222 |
| 4,435,488 | 3/1984 | Bahary et al. | 429/215 X |

FOREIGN PATENT DOCUMENTS 50-134150 10/1975 Japan.
51-18834 2/1976 Japan.
61-158664 7/1986 Japan.
61-158666 7/1986 Japan.

*Primary Examiner*—Stephen J. Kalafut
*Attorney, Agent, or Firm*—Armstrong, Nikaido, Marmelstein, Kubovcik & Murray

[57] ABSTRACT

A rechargeable alkaline storage cell comprises, as main components thereof, a negative electrode, a positive electrode and an electrolyte. The negative electrode is formed of sintered type cadmium electrode including one of a polysaccharide and its derivative having a polymerization degree of more than 320.

18 Claims, 11 Drawing Sheets

SINTERED TYPE NEGATIVE CADMIUM ELECTRODE FOR AN ALKALINE STORAGE CELL AND METHOD OF MANUFACTURING THE SAME

BACKGROUND OF THE INVENTION

1. Field of the Invention

The present invention relates to a sintered type negative cadmium electrode for an alkaline storage cell and to a method of manufacturing the same.

2. Description of the Prior Art

Generally, an electrode employed in an alkaline storage cell is manufactured by the following two methods. The first method is an unsintering method wherein, as disclosed in Japanese Patent Publication Kokai No. 56-82573, the electrode is obtained by kneading powder of an active material with a binder to form a paste, coating the paste on surfaces of a conductive plate and drying the paste. The second method is a sintering method wherein, as disclosed in Japanese Patent Publication Kokai No. 51-18834, the electrode is filled with a desired amount of active material by repeating an active material impregnating process several times. In this process, a porous nickel sintered plaque is impregnated with cadmium nitrate solution, and thereafter the product is subjected to an alkali treatment, rinsing and drying.

The former electrode employing polyvinyl alcohol as the binder is heat treated at a temperature of 120°–220° C. to prevent the dissolution of the binder. However, in this unsintered type electrode, the active material is fixed by the binder, whereby the binder remains among the particles of the active material. This deteriorates conductivity among the particles of the active material and between the active material and conductive plate. Therefore, this type of electrode is inferior in electrode characteristics.

On the other hand, the latter sintered type electrode does not entail the problem of lowering the conductivity since the active material is in direct contact with the sintered plaque and not through the binder. Further, this type of electrode has a conductive matrix present as the porous nickel sintered plaque, thereby having high conductivity within the electrode. Accordingly, the sintered type electrode has excellent electrode characteristics compared with the unsintered type electrode.

In this sintered type electrode having high conductivity, however, the active material becomes inactivated and undischargeable metallic cadmium accumulates with repetition of a charge and discharge cycle where cadmium hydroxide or cadmium oxide is employed as the active material. This problem is peculiar to the sintered type electrode and leads to lowering of the electrode capacity. In the unsintered type electrode having poor conductivity, the cycle life comes to an end because of another factor, for example, falling of the active material before the occurence of the above mentioned phenomenon, i.e. accumulation of the undischargeable metallic cadmium. To prevent this falling of the active material, methyl cellulose may be added to the electrode. However, the more methyl cellulose is added, the poorer conductivity the electrode has. This deteriorates the electrode characteristics.

The lowering of the electrode capacity with progress of the charge and discharge cycles is due to the following. That is, when the metallic cadmium is covered with fine cadmium hydroxide, it is difficult for hydroxide ions to be supplied to the active material from an electrolyte. This leads to the formation and accumulation of the undischargeable metallic cadmium. In order to prevent this phenomenon, it has been proposed to form a polymer film on surfaces of the cadmium active material (cf. Japanese Patent Publication Kokai No. 61-158,666) or to form a high polymer film on surfaces of the electrode (cf. Japanese Patent Publication Kokai No. 61-158,664).

These proposals intend to check the covering of the metallic cadmium with the inactive cadmium hydroxide by forming a high polymer film on the surfaces of the active material or of the electrode, controlling the hydroxide ion supply, thereby forming $\gamma$-$Cd(OH)_2$ having a needle-like crystal structure. However, in these methods, access of oxygen gas to the active material during an oxygen gas consumption reaction is impeded as well. This affects the oxygen gas consumption reaction. This disadvantage is serious particularly in the case of the sintered type electrode having excellent oxygen gas consumption capability.

In addition, where the negative electrode is coated with a high polymer solution as disclosed in the above Japanese Patent Publication Kokai No. 61-158,664, the high polymer does not penetrate into pores of the negative electrode, whereby the high polymer adhesive cannot penetrate into surfaces of the active material within the electrode. Therefore, occulusion of the metallic cadmium cannot be prevented completely, and may hamper the contact between the metallic cadmium and the electrolyte. Accordingly, this method has not been sufficient to prevent the lowering of the negative electrode capacity.

Further, even in the method wherein the negative electrode is impregnated with the high polymer solution under a reduced pressure as disclosed in Japanese Patent Publication Kokai No. 61-158,666, the high polymer cannot penetrate into the pores of the negative electrode. Therefore, this method is also insufficient to prevent the lowering of the negative electrode capacity. In addition, this method requires equipment for reducing the pressure and a long time for vaccumizing. Consequently, this method entails a problem of high manufacturing cost of the negative electrode.

Next, as a further method, it has been proposed to add a polysaccharide or at least one of its derivatives to the active material. This method utilizes the property of the polysaccharide or its derivatives which reduces deposition nucleus of the cadmium hydroxide at the discharging time. Because of this property, refinement of the cadmium hydroxide particles is prevented, whereby it is checked that the metallic cadmium is covered with the cadmium hydroxide.

However, even with this negative cadmium electrode, utilization factor becomes lowered with progress of the charge and discharge cycles, which leads to the lowering of the negative electrode capacity. Therefore, satisfactory results cannot be obtained by adding the polysaccharide or at least one of its derivatives to the electrode. That is, where the polysaccharide mainly comprising a polysaccharide having a polymerization degree of less than 300 or its derivative is added to the electrode, the effect resulting from this addition becomes lower with repetition of the charge and discharge cycle over a long period. This is due to the fact that the polysaccharide or its derivatives having polymerization degree of less than 300 falls from the negative electrode because of their poor binding strength. Therefore, in order to maintain the effect for a long time, a large amount of polysaccharide or its derivatives must be added. However, this deteriorates the oxygen gas consumption capability.

SUMMARY OF THE INVENTION

An object of the present invention, therefore, is to provide an alkaline storage cell having excellent cycle characteristics.

Another object of the present invention is to check inactivation of an active material due to formation and accumulation of undischargeable metallic cadmium without deteriorating oxygen gas consumption capability.

The above objects are fulfilled according to the present invention by a sintered type negative cadmium electrode for an alkaline storage cell characterized in that one of a polysaccharide and its derivatives having a polymerization degree of more than 320 is added to a sintered type cadmium electrode.

The above objects are fulfilled also by a method of producing a negative cadmium electrode for an alkaline storage cell, comprising a first step of manufacturing a sintered type cadmium electrode by filling a nickel sintered plaque with an active material and a second process of adding one of a polysaccharide and its derivatives having a polymerization degree of more than 320 to said sintered type cadmium electrode.

The reason why the above objects are fulfilled by the present invention is as follows. Since the polysaccharide or its derivatives having a polymerization degree of more than 320 have great binding strength, it does not easily fall from the negative electrode in spite of repetition of the charge and discharge cycle. Therefore, the utilization factor of the active material can be prevented from lowering even if the polysaccharide or its derivatives are added in a small amount. As a result, access of the oxygen gas to the active material is not hampered during the oxygen gas consumption reaction, whereby the oxygen gas consumption capability can be maintained at high level.

Further, if the polysaccharide or its derivatives is added only inside the electrode, the oxygen gas consumption capability is improved further, whereby the above objects are fulfilled more effectively.

The negative electrode may be manufactured by adding one of the polysaccharide and its derivatives having a polymerization degree of more than 320 in an amount corresponding to 0.01–0.3 wt % of the active material of the sintered type cadmium electrode.

Where the negative electrode is manufactured according to the above method, the solvent can easily penetrate into the pores even if the pores contain air. When the solvent penetrates into the pores, the polysaccharide or its derivatives are easily dissolved in the solvent. Therefore, even if the polysaccharide or its derivatives have high viscosity, they can penetrate into the pores. Consequently, the polysaccharide or its derivatives penetrate into surfaces of the active material inside the electrode, whereby occulusion of the metallic cadmium is prevented. As a result, the contact between the metallic cadmium and electrolyte is not hampered as a result of repeated charge and discharge cycles. This realizes sufficient prevention of the lowering of the negative electrode capacity.

In addition, neither the equipment for reducing the pressure nor the time for vacuumizing is required, which leads to remarkable reduction in the manufacturing cost of the negative electrode.

In the above method of manufacturing the negative electrode, the polysaccharide may be selected from the group consisting of methyl cellulose, starch, pectin, carboxymethyl cellulose and hydroxypropyl cellulose.

Where the negative electrode is manufactured according to the above method, since $Cd(OH)_2$ [cadmium hydroxide] changes into $CdO$ [cadmium oxide] having a smaller particle size than $Cd(OH)_2$, there are spaces among the active materials. Accordingly, the volume of the pores in which the electrode is impregnated with the polysaccharide and derivatives increases. Further, since the electrode is impregnated with the polysaccharide or its derivatives in the condition that the active material is refined and has an increased surface area, the utilization factor of the active material is improved. In addition, since undischargeable cadmium is formed in an electrochemical formation followed by the charging and discharging, the electrode subjected to the electrochemical formation has a lower utilization factor of the active material. However, if the negative electrode is manufactured as in the above mentioned method, it is possible to check the formation of the undischargeable cadmium at the electrochemical formation time because the electrode is impregnated with the polysaccharide or its derivatives before the electrochemical formation. This improves the utilization factor of the active material, which leads to a further improvement in the charge and discharge characteristics.

DESCRIPTION OF THE PREFERRED EMBODIMENTS

First Embodiment

Example 1

Figure 1:
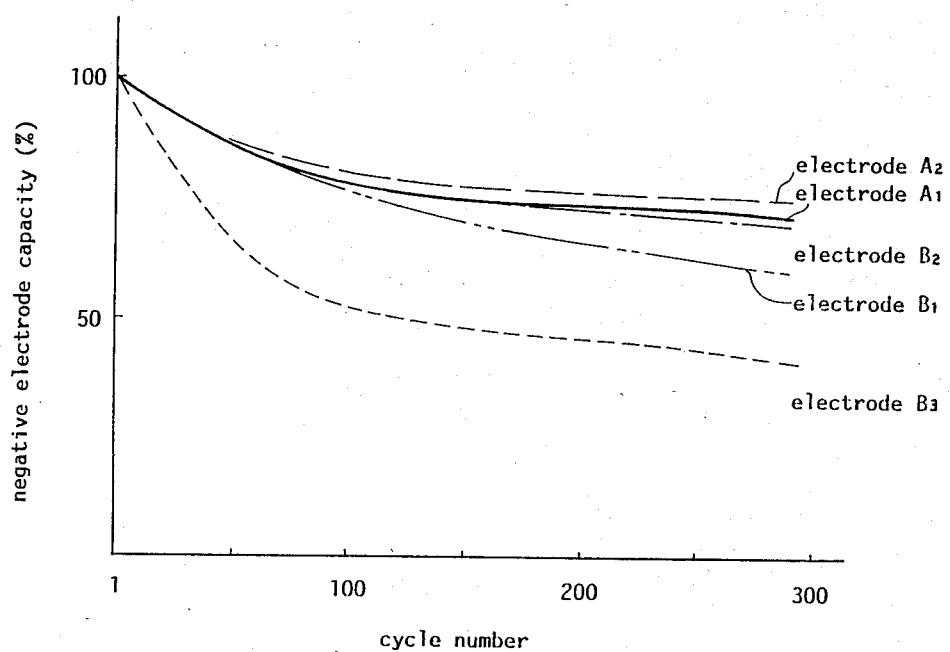
FIG. 1 is a graph showing a relationship between cycle numbers and negative electrode capacities of electrodes $A_1$, $A_2$ according to the present invention and comparative electrodes $B_1-B_3$.

A sintered type cadmium electrode was filled with an active material by repeating an operation wherein a nickel sintered plaque is immersed in a solution including cadmium nitrate as a main component and the product is subjected to an alkali treatment several times. The sintered type cadmium electrode thus obtained was subjected to an electrochemical formation by charging and discharging in alkali solution. This electrode was sprayed with a 0.5 wt % aqueous solution of methyl cellulose mainly comprising a methyl cellulose having a polymerization degree of 320, and thereafter the product was dried. In this process, the amount of methyl cellulose added to the active material corresponds to 0.1% of the active material in weight. The negative electrode thus obtained is referred to as electrode $A_1$ hereinafter.

Next, this electrode $A_1$ was combined with a sintered type nickel electrode obtained by a chemical impregnating method to manufacture an SC-size cell (having a nominal capacity of 1200 mAH). The cell thus obtained is referred to as cell $a_1$ hereinafter.

Example 2

A negative cadmium electrode was manufactured in the same way as Example 1 except that the electrode was sprayed with a 0.5 wt % aqueous solution of methyl cellulose mainly comprising a methyl cellulose having a polymerization degree of 460 and corresponding to 0.1% of the active material in weight. The negative electrode thus obtained is referred to as electrode $A_2$ hereinafter.

Next, this electrode $A_2$ was combined with the sintered type nickel electrode used in Example 1 to manufacture an SC-size cell. The cell thus obtained is referred to as cell $a_2$ hereinafter.

Comparative Example 1

A negative cadmium electrode was manufactured in the same way as Example 1 except that the electrode was sprayed with a 0.5 wt % aqueous solution of methyl cellulose mainly comprising a methyl cellulose having a polymerization degree of 220 and corresponding to 0.1% of the active material in weight. The negative electrode thus obtained is referred to as electrode $B_1$ hereinafter.

Next, this electrode $B_1$ was combined with the sintered type nickel electrode used in Example 1 to manufacture an SC-size cell. The cell thus obtained is referred to as cell $b_1$ hereinafter.

Comparative Example 2

A negative cadmium electrode was produced in the same way as Comparative Example 1 except that the electrode was sprayed with a solution of methyl cellulose corresponding to 0.5% of the active material in weight. The negative electrode thus obtained is referred to as electrode $B_2$ hereinafter.

Next, this electrode $B_2$ was combined with the sintered type nickel electrode used in Example 1 to manufacture an SC-size cell. The cell thus obtained is referred to as cell $b_2$ hereinafter.

Comparative Example 3

A negative cadmium electrode was manufactured in the same way as Example 1 except that the polysaccharide or its derivatives were not added to the active material. The negative electrode thus obtained is referred to as electrode $B_3$ hereinafter.

Next, this electrode $B_3$ was combined with the sintered type nickel electrode used in Example 1 to manufacture an SC-size cell. The cell thus obtained is referred to as cell $b_3$ hereinafter.

Experiment 1

The cycle characteristics of the electrodes $A_1$, $A_2$ according to the present invention, and comparative electrodes $B_1$, $B_2$ and $B_3$ were examined and the results are shown in FIG. 1. This experiment was conducted under the condition that the electrodes were charged with a current of $\frac{1}{3}C$ up to 160% and discharged with a current of 2C until the cell voltages fell to 1.0 V. The cell capacity at the first cycle is 100%.

Figure 2:
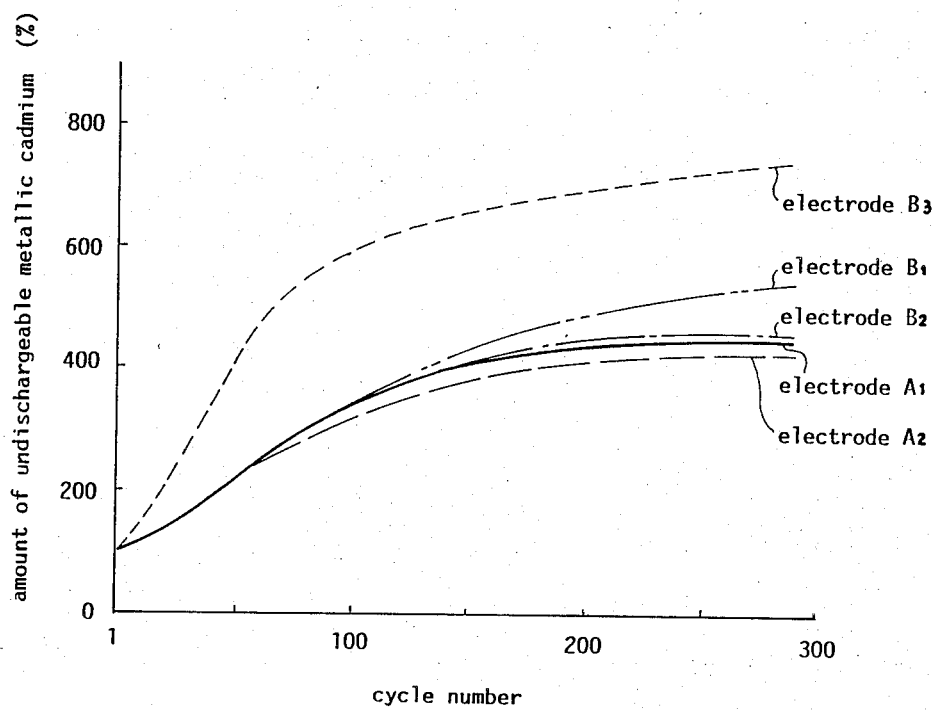
FIG. 2 is a graph showing a relationship between the cycle numbers and the amount of undischarageable metallic cadmium of the electrodes $A_1$, $A_2$ according to the present invention and comparative electrodes $B_1-B_3$.

As apparent from FIG. 1, the electrodes $A_1$ and $A_2$ according to the present invention added with methyl cellulose having the polymerization degrees of 320 and 460 respectively have excellent cycle characteristics compared with the comparative electrodes $B_1$ and $B_2$ added with methyl cellulose having the polymerization degree of 220, although the same or less amount of the methyl cellulose was added. This is due to the fact that the formation and accumulation of the undischargeable metallic cadmium with progress of the charge and discharge cycles were suppressed as shown in FIG. 2. The amount of the undischargeable metallic cadmium after the first cycle is 100%.

Experiment 2

Cells $a_1$, $a_2$ according to the present invention and comparative cells $b_1$–$b_3$ were charged continuously at a temperature of 0° C. with a current of 0.2C and the internal pressures were checked. The results are shown in FIG. 3.

Figure 3:
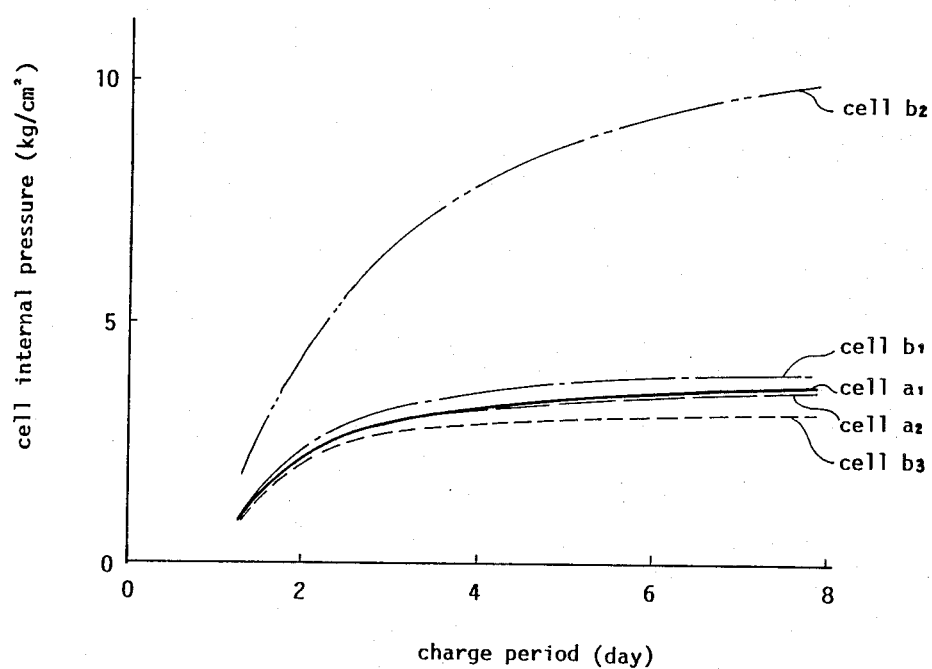
FIG. 3 is a graph showing a relationship between the charge periods and internal pressures of cells $a_1$, $a_2$ according to the present invention and comparative cells $b_1-b_3$.

It will be seen from FIG. 3 that cells $a_1$ and $a_2$ have substantially the same internal gas pressure as cell $b_3$ which was not added with the methyl cellulose. Accordingly, it is understood that the present invention prevents the lowering of the oxygen gas consumption capability.

Experiment 3

Figure 4:
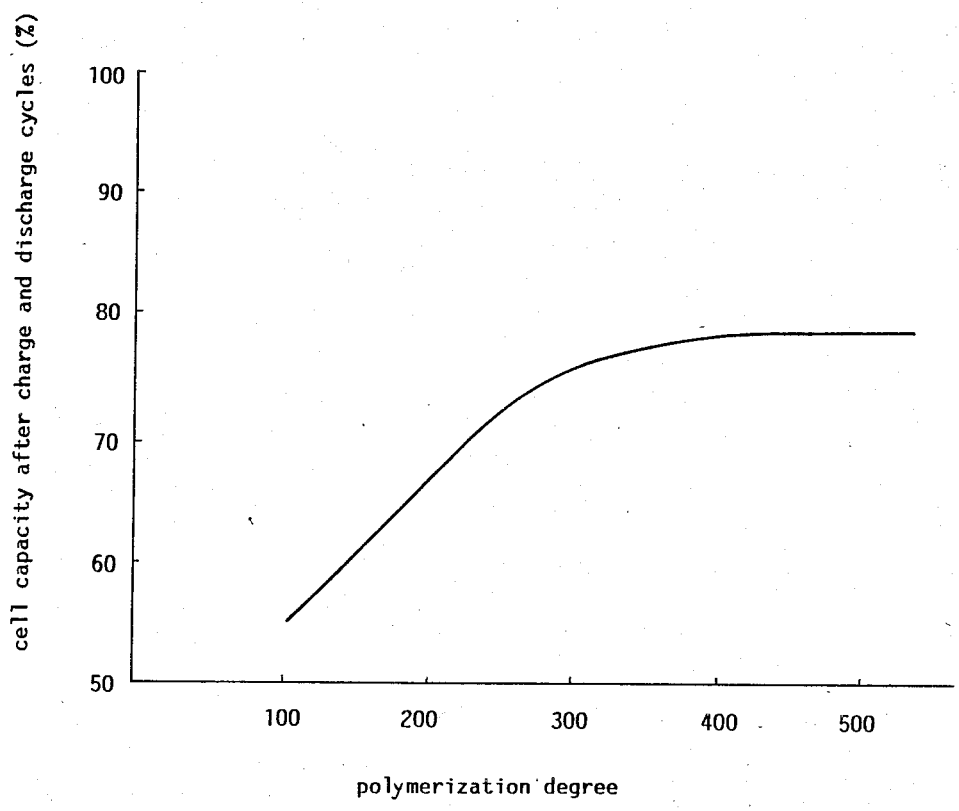
FIG. 4 is a graph showing a relationship between the polymerization degree and the cell capacity after charge and discharge cycles.

A relationship between the polymerization degree of methyl cellulose and the electrode capacity after charge and discharge cycles was examined. The results are shown in FIG. 4. This experiment was conducted under the same condition as Experiment 1.

It will be seen from FIG. 4 that the electrode capacity is maintained at almost 80% if the polymerization degree of the methyl cellulose is more than 320. Therefore, it is preferable that the methyl cellulose has the polymerization degree of more than 320.

Experiment 4

Figure 5:
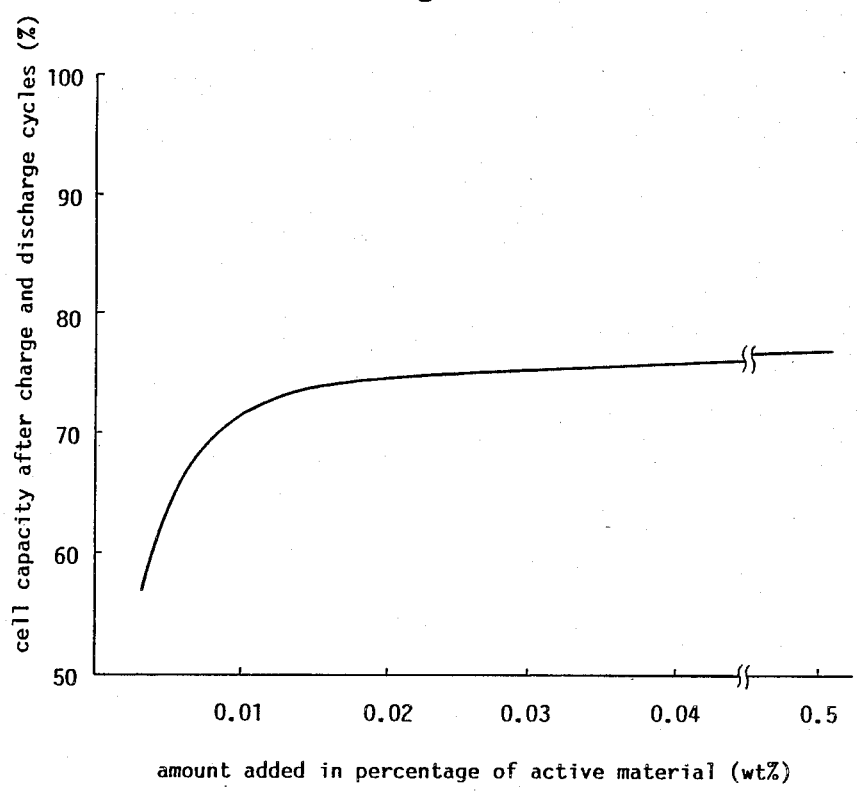
FIG. 5 is a graph showing a relationship between the amount of the polysaccharide and derivatives added, and the cell capacity after charge and discharge cycles.

A relationship between the amount of methyl cellulose (having a polymerization degree of more than 320) added and the electrode capacity after the charge and discharge cycles was examined. The results are shown in FIG. 5. The experiment was conducted under the same condition as Experiment 1.

It will be seen from FIG. 5 that the electrode capacity is maintained at more than 70% if the amount of methyl cellulose added is more than 0.01% of the active material in weight. Therefore, it is preferable that the amount of methyl cellulose added is more than 0.01% of the active material in weight.

Experiment 5

Figure 6:
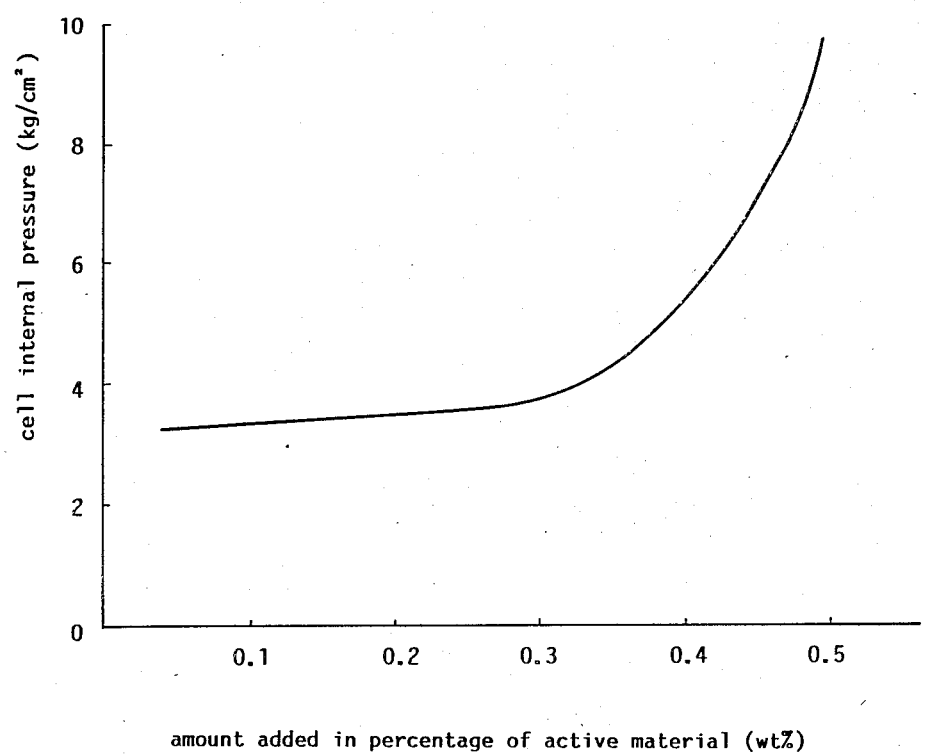
FIG. 6 is a graph showing a relationship between the amount of the polysaccharide and derivatives added, and the internal cell pressure.

A relationship between the amount of the methyl cellulose (having the polymerization degree of more than 320) and the cell internal pressure was examined. The results are shown in FIG. 6. This experiment was conducted under the same condition as Experiment 2.

It will be seen from FIG. 6 that the cell internal pressure rises sharply when the amount of methyl cellulose added is more than 0.3% of the active material in weight. Therefore, it is preferable that the amount of methyl cellulose added is less than 0.3% of the active material in weight.

The results obtained in Experiments 4 and 5 indicate that the amount of methyl cellulose (having the polymerization degree of more than 320) added is preferably within the range of 0.01–0.3 wt % of the active material.

In the above mentioned First Embodiment, methyl cellulose was employed as an example of polysaccharide or its derivatives. The present invention is not limited to this, but other materials such as starch, pectin, carboxymethyl cellulose and hydroxypropyl cellulose may be employed if these materials have the polymerization degree of more than 320.

Second Embodiment

Example

First, a porous nickel sintered plaque was impregnated with an aqueous solution of cadmium nitrate. Then, the electrode was filled with a desired amount of cadmium hydroxide by repeating an active material impregnating process six times wherein the plaque is subjected to an alkali treatment, rinsed with water and dried. Next, the electrode thus obtained was subjected to an electrochemical formation by charging and discharging in alkali solution. Thereafter, the product was rinsed with water and dried. Further, the electrode subjected to the electrochemical formation was immersed in a 1% aqueous solution of methyl cellulose (having a polymerization degree of 320), and then, the methyl cellulose present on surfaces of the electrode was removed by brushing to manufacture a negative cadmium electrode. The negative electrode thus obtained is referred to as electrode C hereinafter.

Next, this electrode C was combined with the sintered type nickel electrode obtained by chemical impregnating method to manufacture an SC-size cell. The cell thus obtained is referred to as cell c hereinafter.

Comparative Example 1

A negative electrode was manufactured in the same way as the above Example except that the electrode was not immersed in the aqueous solution of methyl cellulose and was not subjected to brushing. The negative electrode thus obtained is referred to as electrode $D_1$ hereinafter.

Next, this electrode $D_1$ was combined with the sintered type nickel electrode used in the above Example to manufacture an SC-size cell. The cell thus obtained is referred to as cell $d_1$ hereinafter.

Comparative Example 2

A negative electrode was manufactured in the same way as the above Example except that the electrode was not subjected to brushing. The negative electrode thus obtained is referred to as electrode $D_2$ hereinafter.

Next, this electrode $D_2$ was combined with the sintered type nickel electrode used in the above Example to manufacture an SC-size cell. The cell thus obtained is referred to as cell $d_2$ hereinafter.

Experiment 1

Figure 7:
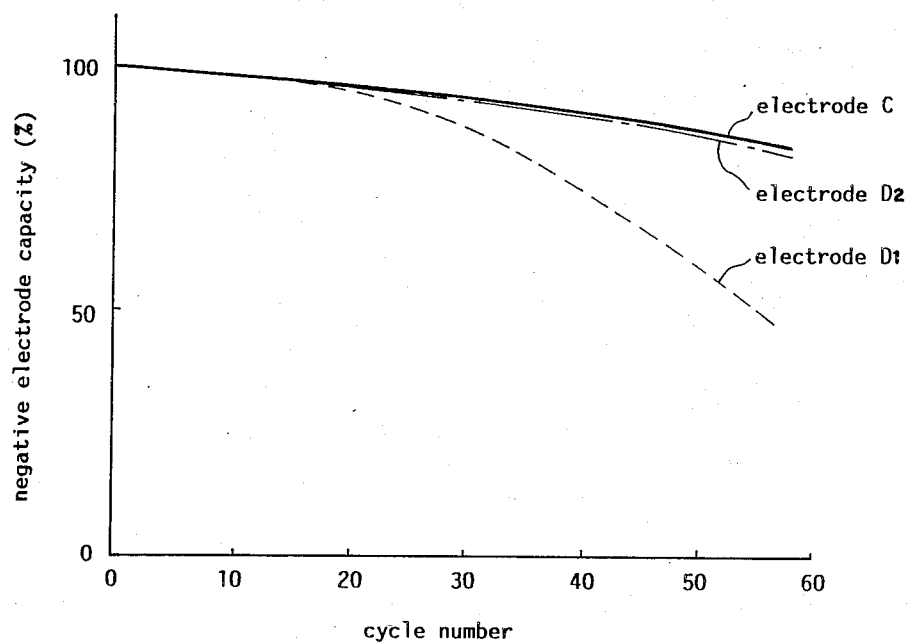
FIG. 7 is a graph showing a relationship between the cycle numbers and negative electrode capacities of electrode C according to the present invention, and comparative electrodes $D_1$ and $D_2$.

The cycle characteristics of the electrode C, comparative electrodes $D_1$ and $D_2$ were compared and the results are shown in FIG. 7. This experiment was conducted under the same condition as Experiment 1 of the First Embodiment.

Figure 8:
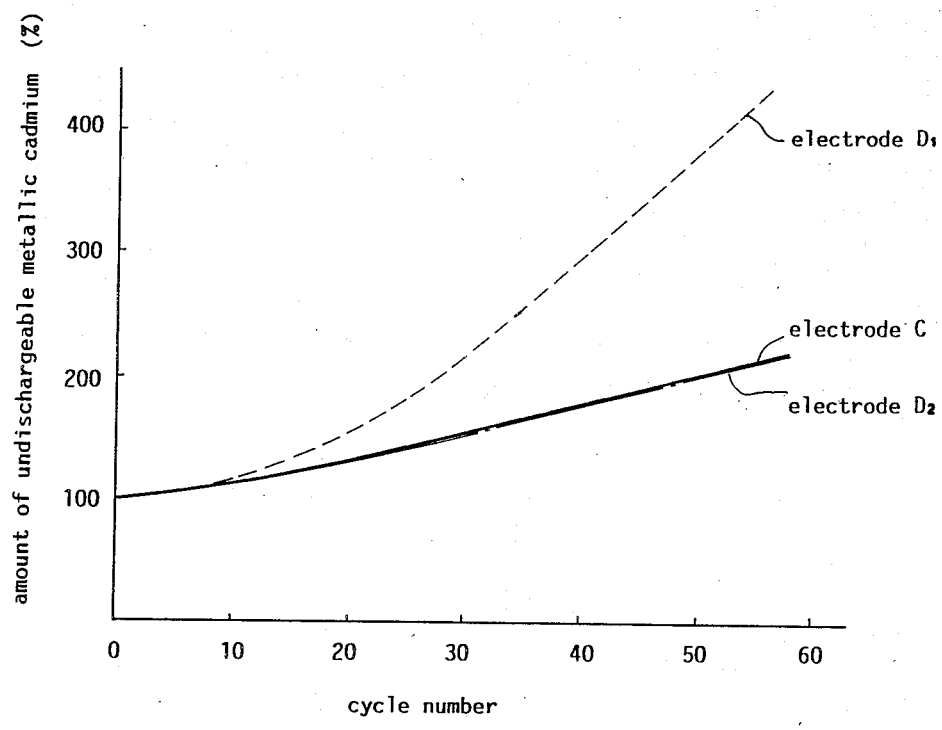
FIG. 8 is a graph showing a relationship between the cycle numbers and the amounts of the undischargeable metallic cadmium of electrode C according to the present invention, and comparative electrodes $D_1$ and $D_2$.

It will be seen from FIG. 7 that the electrode $D_1$ which was not added with methyl cellulose has a cell capacity lowering rapidly near the 20th cycle. On the other hand, the electrode C and $D_2$ added with methyl cellulose have cell capacities lowering slowly even after the 20th cycle. Accordingly, the electrode C and $D_2$ are superior to the electrode $D_1$ in cycle characteristics. This is due to the fact that, as shown in FIG. 8, the electrodes C and $D_2$ have a less amount of the undischargeable metallic cadmium formed and accumulated with progress of the charge and discharge cycles, whereby the electrode activity is maintained at high level.

Experiment 2

The cell c according to the present invention, and comparative cells $d_1$ and $d_2$ were charged continuously under the same condition as Experiment 3 of the First Embodiment and the cell internal pressures at this time were examined. The results are shown in FIG. 9.

Figure 9:
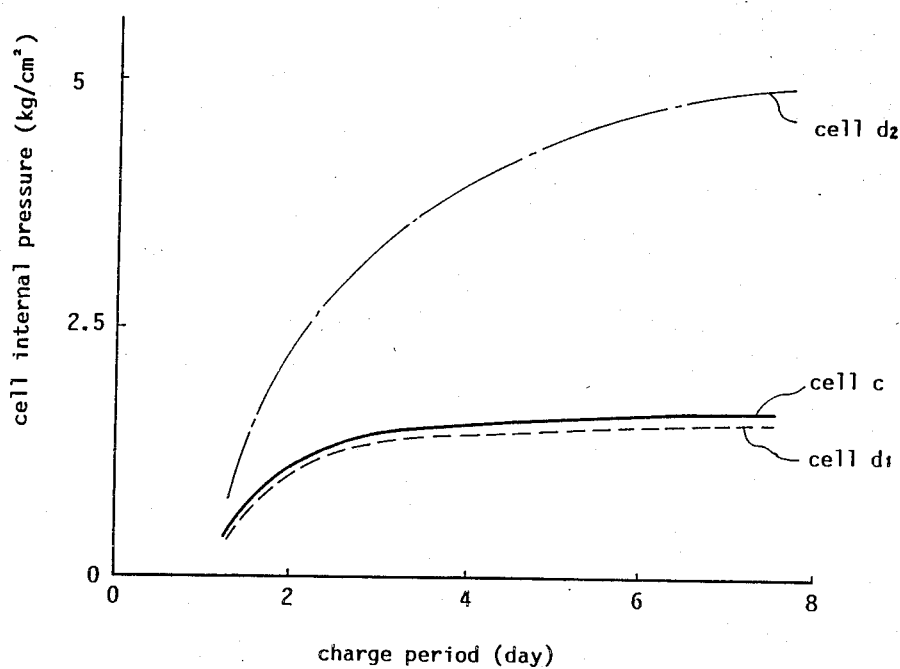
FIG. 9 is a graph showing a relationship between the charge periods and the internal pressures of cell c according to the present invention, and comparative cells $d_1$ and $d_2$.

It will be seen from FIG. 9 that the cell c according to the present invention in which the methyl cellulose present on surfaces of the electrode was removed has substantially the same oxygen gas consumption capability as the cell $d_1$ which was not added with the methyl cellulose. On the other hand, with the cell $d_2$ added with methyl cellulose, the excellent oxygen gas consumption capability peculiar to the sintered type cadmium electrode cannot be seen. This is considered due to the following.

The oxygen gas consumption reaction with this type of sintered type cadmium electrode is expressed by the following formulas.

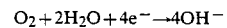

$$O_2 + 2H_2O + 4e^- \rightarrow 4OH^- \qquad 1$$

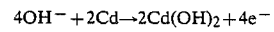

$$4OH^- + 2Cd \rightarrow 2Cd(OH)_2 + 4e^- \qquad 2$$

The above reaction expressed by the formula 1 occurs on the nickel sintered plaque capable of contacting the electrolyte and oxygen gas. Accordingly, with the cell $d_2$ having the electrode $D_2$ whose surfaces are covered with the methyl cellulose, the oxygen gas consumption capability becomes lowered. On the other hand, with the cell c having the electrode C which contains methyl cellulose within the base electrode by removing methyl cellulose on surfaces by brushing, the oxygen gas consumption capability is maintained at high level. Therefore, it is possible to prevent the formation and accumulation of the undischargeable metallic cadmium.

In the aforesaid Second Embodiment, methyl cellulose was employed as an example of polysaccharide or its derivatives. However, the present invention is not limited to this, but other materials such as starch, pectin, carboxymethyl cellulose and hydroxypropyl cellulose can be used.

Although, in this embodiment, the electrode was added with polysaccharide or its derivatives by immersing the electrode in an aqueous solution, this coating can also be effected by the spray method or roller method. In addition, the removal of the polysaccharide from surfaces of the electrode for improving the oxygen gas consumption capability can be effected by rinsing with water or wiping instead of the above described brushing.

Third Embodiment

Example 1

First, impurities in the sintered type cadmium electrode was removed by carrying out an electrochemical formation. Next, this cadmium electrode was rinsed with water and dried. Then, the cadmium electrode was immersed in water to impregnate the electrode with water and the product was coated with a 1 wt % aqueous solution of methyl cellulose (having a polymerization degree of 320). Thereafter, the cadmium electrode was dried and cut into pieces 200 mm×33.5 mm in dimensions. A negative electrode having a electrode capacity of 3000 mAh was obtained through the above process. A cell was manufactured by employing the negative electrode, the positive nickel electrode(sintered type) having the same size as the negative electrode and an aqueous solution having a specific gravity of 1.23. The cell thus obtained is referred to as cell $e_1$ hereinafter.

Example 2

A cell was manufactured in the same way as the First Embodiment except that the negative electrode was prepared by immersing the cadmium electrode in a solution of methanol and coating the product with the methanol solution of 1 wt % methyl cellulose. The cell thus obtained is referred to as cell $e_2$ hereinafter.

Example 3

A cell was manufactured in the same way as the First Embodiment except that the negative electrode was coated with the aqueous solution of 1 wt % methyl cellulose without being dried. The cell thus obtained is referred to as cell $e_3$ hereinafter.

Comparative Example 1

A cell was manufactured in the same way as the First Embodiment except that the cadmium electrode was immersed in water and coated with the aqueous solution of 1 wt % of methyl cellulose. The cell thus obtained is referred to as cell $f_1$ hereinafter.

Comparative Example 2

A cell was produced in the same way as the First Embodiment except that the negative electrode was prepared by immersing the cadmium electrode in water and omitting the subsequent process. The cell thus obtained is referred to as cell $f_2$ hereinafter.

Experiment 1

Figure 10:
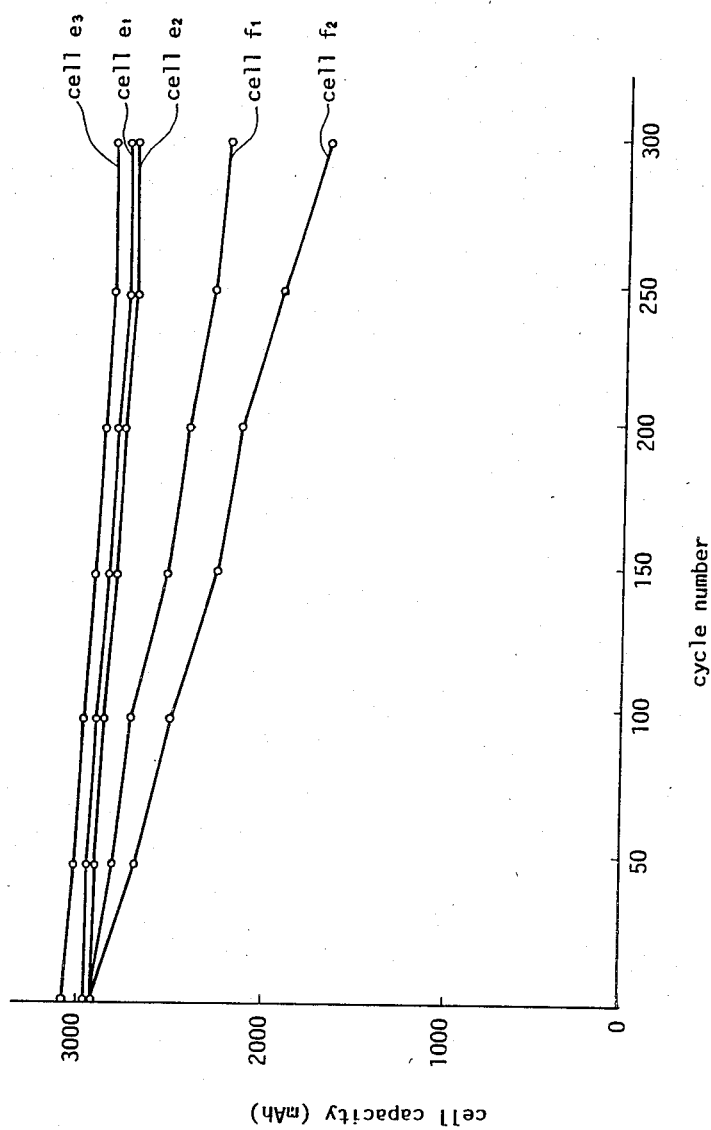
FIG. 10 is a graph showing a relationship between the cycle numbers and cell capacities of cells $e_1-e_3$ according to the present invention, and comparative cells $f_1$ and $f_2$.

Cycle characteristics of the cells $e_1$–$e_3$ according to the present invention, and comparative cells $f_1$ and $f_2$ were checked. The results are shown in FIG. 10. This experiment was conducted under the condition that the electrodes were charged with a current corresponding to 3/10 of the cell capacity for 4.8 hours and discharged with a current corresponding to the cell capacity.

As apparent from FIG. 10, the comparative cells $f_1$ and $f_2$ have cell capacities lowering sharply with progress of the charge and discharge cycles. The cell capacity of the cell $f_1$ was lowered to about 2200 mAh and the cell capacity of the cell $f_2$ to about 1600 mAh relatively after the 300th cycle. In contrast, the cells $e_1$–$e_3$ according to the present invention have the cell capacities remaining unchanged with progress of the charge and discharge cycles. These cells have cell capacities of 2800 mAh, 2800 mAh and 2900 mAh respectively after the 300th cycle. As a result, the cells $e_1$–$e_3$ according to the present invention have remarkably improved cycle characteristics compared with the comparative cells $f_1$ and $f_2$.

And the cell $e_3$ according to the present invention has slightly higher cell capacities at initial stages of the cycle and after the 300th cycle than the cells $e_1$ and $e_2$. This is considered due to the following.

Since the cell $e_3$ was not subjected to drying after the electrochemical formation, the number of drying steps is less by one than the cells $e_1$ and $e_2$. Accordingly, oxidation of cadmium in the negative electrode is prevented more effectively, which leads to an improvement in the activity of the cadmium active material.

According to the method by which the cell $e_3$ was manufactured, the electrode is coated with the 1 wt % aqueous solution of methyl cellulose after the electrochemical formation and rinsing. This makes it possible to effect the rinsing and coating successively. Therefore, these processes can be effected in the same line, which leads to reduction in the number of processes. Accordingly, it is possible to reduce the manfacturing cost of the alkaline storage cell.

Further, in the above mentioned embodiment, the electrode was rinsed with water after the electrochemical formation and the liquid used for the electrochemical formation can be employed as a solvent for the polysaccharide or its derivatives. In addition, the present invention requires the drying process after the polysaccharide or its derivatives is added. In this case, since the cadmium active material is covered with the polysaccharide or its derivatives sufficiently, the active cadmium material is not easily oxidized.

Fourth Embodiment

Example

A cadmium oxide electrode was manufactured by heat treating a cadmium hydroxide electrode filled with an active material by the chemical impregnating method. Next, this cadmium oxide electrode was immersed in a 1 wt % aqueous solution of methyl cellulose (having a polymerization degree of 320) and subjected to an electrochemical formation in alkali solution to manufacture a negative electrode. The negative electrode thus obtained is referred to as electrode G hereinafter.

Next, a cell was manufactured by employing this electrode G, the sintered type nickel electrode and potassium hydroxide(KOH) having a specific gravity of 1.23. The cell thus obtained is referred to as cell g hereinafter.

Comparative Example 1

A negative electrode was manufactured by electrochemically forming the cadmium hydroxide electrode filled with the active material by chemical impregnating method in alkali solution, and thereafter immersing the cadmium hydroxide electrode in a 1 wt % aqueous solution of methyl cellulose. The negative electrode thus obtained is referred to as electrode $H_1$ hereinafter.

Next, a cell was manufactured by employing the electrode $H_1$, the sintered type nickel electrode and potassium hydroxide. The cell thus obtained is referred to as cell $H_1$ hereinafter.

Comparative Example 2

A negative electrode was manufactured by electrochemically forming the cadmium hydroxide electrode filled with the active material by chemical impregnating method in alkali solution.

Next, a cell was manufactured by employing the electrode $H_2$, the sintered type nickel electrode and potassium hydroxide. The cell thus obtained is referred to as cell $h_2$ hereinafter.

Experiment 1

The amounts of the methyl cellulose impregnating the electrode G according to the present invention and comparative electrode $H_1$ were checked. The results are shown in the following Table 1.

TABLE 1

| electrode | impregnating amount |
|---|---|
| G | 27.3 mg |
| H1 | 15.9 mg |

As shown in Table 1, the electrode G is impregnated with a greater amount of methyl cellulose than the electrode $H_1$, thereby enabling uniform covering of the fine active material particles.

Experiment 2

Figure 11:
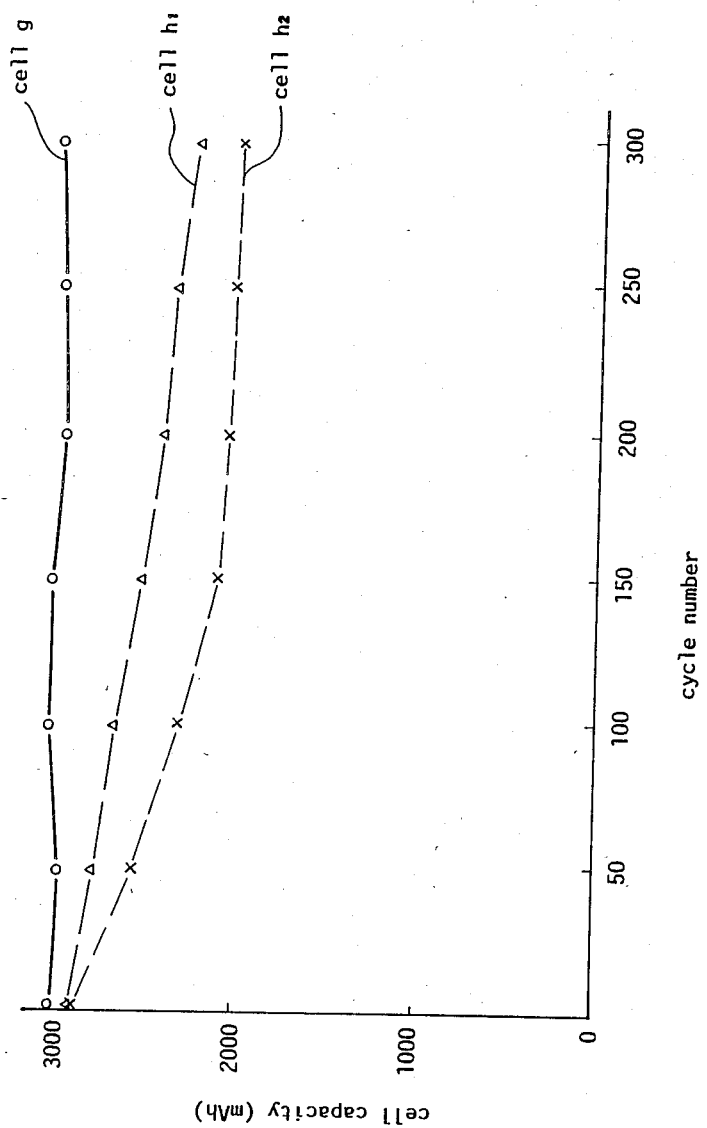
FIG. 11 is a graph showing a relationship between the cycle numbers and cell capacities of cell g according to the present invention, and comparative cells $h_1$ and $h_2$.

Cycle characteristics of the cell g according to the present invention, and comparative cells $h_1$ and $h_2$ were examined. The results are shown in FIG. 11. This experiment was conducted under the condition that the electrodes were charged with a current of 0.3 C (C: cell capacity) for 4.8 hours and discharged with a current of 1C.

It will be seen from FIG. 11 that the cell capacities of the cells $h_1$ and $h_2$ became lowered to about 2200–2400 mAh after the 300th cycle. On the other hand, the cell capacity of the cell g remained at 3000 mAh. It will be understood from these results that the cell g according to the present invention has remarkably improved cycle characteristics compared with the comparative cells $h_1$ and $h_2$.

In addition, the cell g according to the present invention has a slightly high initial capacity compared with the comparative cells $h_1$ and $h_2$. This is due to the fact that the formation of the undischargeable cadmium at the electrochemical forming time is suppressed according to the present invention. This feature improves the utilization factor of the active material.

In the above embodiment, the electrode was heat treated at a temperature of 220° C. and the same results can be obtained if the temperature is higher than 200° C. The upper limit of the heating temperature is less than the temperature at which the oxidization of the nickel sintered plaque of the sintered type electrode occurs.

What is claimed is:

1. A sintered type negative cadmium electrode for an alkaline storage cell containing at least one of a polysaccharide and its derivatives having a polymerization degree of more than 320.

2. A negative cadmium electrode as claimed in claim 1 wherein said at least one of polysaccharide and its derivatives is substantially only inside said electrode.

3. A negative cadmium electrode as claimed in claim 1 wherein said at least one of polysaccharide and its derivatives having a polymerization degree of more than 320 comprises about 0.01–0.3 wt. % of the active material of the electrode.

4. A negative cadmium electrode as claimed in claim 1, characterized in that said polysaccharide or its derivatives is selected from the group consisting of methyl cellulose, starch, pectin, carboxymethyl cellulose and hydroxypropyl cellulose.

5. A method of producing a sintered type negative cadmium electrode for an alkaline storage cell comprising;
   a first process of manufacturing an electrode by filling a nickel sintered plaque with an active material and,
   a second process of adding at least one of one of a polysaccharide and its derivatives having a polymerization degree of more than 320 to said electrode.

6. A method as claimed in claim 5, characterized in that said electrode is electrochemically formed between the first process and the second process.

7. A method as claimed in claim 5, characterized in that said electrode is electrochemicaly formed after the second process.

8. A method as claimed in claim 5, characterized in that at least one of the polysaccharide and its derivatives having a polymerization degree of more than 320 is added only inside the electrode in the second process.

9. A method as claimed in claim 5, characterized in that said electrode is immersed in a solution of at least one of the polysaccharide and its derivatives having a polymerization degree of more than 320 in the second process.

10. A method as claimed in claim 5, characterized in that said second process is carried out by spraying the electrode with a solution of at least one of the polysaccharide and its derivatives having a polymerization degree of more than 320.

11. A method as claimed in claim 5, characterized in that said second process is carried out by coating the electrode with a solution of at least one of the polysaccharide and its derivatives having a polymerization degree of more than 320 by means of a roller.

12. A method as claimed in claim 8, characterized in that one of the polysaccharide and its derivatives having a polymerization degree of more than 320 is added substantially only inside the electrode by brushing surfaces of the electrode after at least one of the polysaccharide and its derivatives is added to the electrode.

13. A method as claimed in claim 8, characterized in that at least one of the polysaccharide and its derivatives having a polymerization degree of more than 320 is added only inside the electrode by rinsing surfaces of the electrode with water after said polysaccharide and its derivatives is added to the electrode.

14. A method in claim 8, characterized in that at least one of the polysaccharide and its derivatives having a polymerization degree of more than 320 is added only inside the electrode by wiping surfaces of the electrode after said polysaccharide and its derivatives is added to the electrode.

15. A method as claimed in claim 5, characterized in that the second process comprises;
   a first step of allowing said electrode to hold a solvent in pores thereof, and
   a second step of allowing said electrode to hold in pores thereof a solution prepared by dissolving at least one of the polysaccharide and its derivatives having a polymerization degree of more than 320 in said solvent.

16. A method as claimed in claim 5, characterized in that the electrode filled with cadmium hydroxide acting as an active material is heat treated at a temperature of more than 200° C. to change the cadmium hydroxide into cadmium oxide.

17. A method as claimed in claim 5, characterized in that at least one of the polysaccharide and its derivatives is added in an amount corresponding to 0.01-0.3 wt % of the active material of the electrode.

18. A method as claimed in claim 5, characterized in that said polysaccharide and its derivatives are selected from the group consisting of methyl cellulose, starch, pectin, carboxymethyl cellulose and hydroxypropyl cellulose.

* * * * *